(12) United States Patent
Noguchi et al.

(10) Patent No.: US 6,391,947 B1
(45) Date of Patent: *May 21, 2002

(54) INK COMPOSITION

(75) Inventors: Hiromichi Noguchi, Atsugi; Yuko Suga, Tokyo; Katsuhiro Shirota, Inagi; Akio Kashiwazaki; Aya Takaide, both of Yokohama, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/664,185

(22) Filed: Jun. 14, 1996

Related U.S. Application Data

(63) Continuation of application No. 08/220,443, filed on Mar. 30, 1994, now abandoned.

(30) Foreign Application Priority Data

Mar. 31, 1993 (JP) .............................. 5-074185
Nov. 25, 1993 (JP) .............................. 5-295446

(51) Int. Cl.⁷ .............................................. C08K 5/45
(52) U.S. Cl. .................... 524/84; 524/104; 524/106; 524/111; 524/173; 524/211; 524/213; 524/308; 524/317; 524/326; 524/357; 524/376; 524/377; 524/378; 524/379; 524/381; 524/387; 524/388; 524/535; 524/555
(58) Field of Search .................. 524/555, 84, 104, 524/106, 111, 173, 211, 213, 308, 317, 326, 357, 376, 377, 378, 379, 381, 387, 388, 535; 106/20 D

(56) References Cited

U.S. PATENT DOCUMENTS

| | | | |
|---|---|---|---|
| 4,395,524 A | * 7/1983 | Emmons et al. | 526/307.2 |
| 4,680,332 A | 7/1987 | Hair et al. | 524/377 |
| 4,804,411 A | 2/1989 | Eida et al. | 106/22 |
| 4,864,324 A | 9/1989 | Shirota et al. | 346/1.1 |
| 5,059,246 A | 10/1991 | Yamamoto et al. | 106/22 |
| 5,074,914 A | 12/1991 | Shirota et al. | 106/22 |
| 5,085,698 A | * 2/1992 | Ma et al. | 106/20 D |
| 5,100,471 A | * 3/1992 | Winnik et al. | 106/23 |
| 5,110,356 A | 5/1992 | Shirota et al. | 106/22 |
| 5,118,351 A | 6/1992 | Shirota et al. | 106/22 |
| 5,123,960 A | 6/1992 | Shirota et al. | 106/22 |
| 5,135,570 A | 8/1992 | Eida et al. | 106/22 |
| 5,135,571 A | 8/1992 | Shirota et al. | 106/22 |
| 5,139,573 A | 8/1992 | Yamamoto et al. | 106/22 |
| 5,141,556 A | * 8/1992 | Matrick | 106/20 D |
| 5,141,558 A | 8/1992 | Shirota et al. | 106/22 |
| 5,151,128 A | 9/1992 | Fukushima et al. | 106/20 |
| 5,160,370 A | 11/1992 | Suga et al. | 106/20 |
| 5,172,133 A | 12/1992 | Suga et al. | 346/1.1 |
| 5,184,148 A | 2/1993 | Suga et al. | 346/1.1 |
| 5,190,581 A | 3/1993 | Fukushima et al. | 106/20 D |
| 5,216,437 A | 6/1993 | Yamamoto et al. | 346/1.1 |
| 5,220,347 A | 6/1993 | Fukushima et al. | 346/1.1 |
| 5,221,333 A | 6/1993 | Shirota et al. | 106/20 D |
| 5,229,786 A | * 7/1993 | Suga et al. | 106/20 D |
| 5,231,417 A | 7/1993 | Shirota et al. | 346/1.1 |
| 5,248,991 A | 9/1993 | Shirota et al. | 346/1.1 |
| 5,250,121 A | 10/1993 | Yamamoto et al. | 106/22 R |
| 5,254,157 A | 10/1993 | Koike et al. | 106/20 D |
| 5,258,066 A | 11/1993 | Kobayashi et al. | 106/22 R |
| 5,296,022 A | 3/1994 | Kobayashi et al. | 106/20 D |

FOREIGN PATENT DOCUMENTS

| | | | |
|---|---|---|---|
| DE | 3835009 A1 | | 1/1990 |
| EP | 447587 | * | 9/1991 |
| EP | 447588 | * | 9/1991 |
| EP | 0586101 | | 3/1994 |
| GB | 2031448 | | 4/1980 |
| JP | 56147863 | | 11/1981 |
| JP | 56-155262 | | 12/1981 |
| JP | 2255875 | | 10/1990 |
| JP | 4-185344 | | 7/1992 |

OTHER PUBLICATIONS

I. Prigogine and R. Defay, "Chemical Thermodynamics" (1954).
John W. Cahn, "Phase Separation by Spinodal Decomposition in Isotropic Systems", The Journal of Chemical Physics, vol. 42, No. 1, pp. 93–99 (1/65).
J.J. van Aartsen, "Theoretical Observations on Spinodal Decomposition of Polymer Solutions", European Polymer Journal, vol. 6, No. 9, pp. 919–924.
Yoshio Suda, Bulletin of Research Institute for Polymers and Textiles, Research Report No. 144, pp. 1–139 (partial) (1984).
WPI/Derwent AN 82–00866E [01] with respect to JP–A–56–155 262 of Dec. 1, 1981.
WPI/Derwent AN 92–272786 [33] with respect to JP–A–4–185–344 of Jul. 2, 1992.

* cited by examiner

Primary Examiner—Judy M. Reddick
(74) Attorney, Agent, or Firm—Fitzpatrick, Cella, Harper & Scinto

(57) ABSTRACT

An ink for ink-jet recording is provided which contains a coloring material and an aqueous liquid medium for solving or dispersing the coloring material, the liquid medium having a lower critical consolute temperature (Tc) to cause phase separation at a temperature in the range of from 40 to 100° C. Ink-jet recording method and an ink-jet recording apparatus employing the above ink are also provided.

7 Claims, 5 Drawing Sheets

INK COMPOSITION

This application is a continuation of application Ser. No. 08/220,443 filed Mar. 30, 1994, now abandoned.

BACKGROUND OF THE INVENTION

1. Field of the Invention

The present invention relates to an ink suitable for ink-jet recording, and an ink-jet recording method employing the ink. More specifically, the present invention relates to an ink which realizes high-quality recording with excellent fixation of the ink on plain paper such as wood-free paper, copying paper, letter paper, heat-transfer paper, business form paper for wire-dot printing, and also to an ink-jet recording method employing the above ink.

The present invention also relates to an apparatus charged with the above ink.

2. Related Background Art

Conventionally for ink-jet recording, an aqueous ink is used which comprises a water-soluble dye and an aqueous medium for dissolving the dye. The ink for ink-jet recording is required:

(1) to give sufficient density of an image,
(2) to dry quickly on a recording medium,
(3) to cause less bleeding of recorded images,
(4) not to cause flow-out even when the image is brought into contact with water or alcohol,
(5) to form recorded images having sufficient light-fastness,
(6) not to clog an ink nozzle,
(7) not to cause inconvenience such as blurring of a recorded image during continuous recording or after interruption of recording for a long time,
(8) to be stable in storage, and
(9) to be safe for persons handling the ink, In ink-jet recording utilizing thermal energy, the ink is further required:

(10) to have sufficient thermal stability, and to give no adverse effect to a thermal energy-generating means.

These requirements cannot all be satisfied simultaneously with conventional material constitution of ink-jet recording inks. Therefore, conventional inks do not necessarily satisfy the recent requirements for the performance of inks.

Most conventional inks, which are composed of a water-soluble dye, water, and a water-soluble organic solvent, involve a particularly difficult problem of inconsistency of printed image quality with ink fixability. In recent years, solid jet technique has been put to practical use. In this technique, a solid ink is liquefied at ejection, and the ink medium itself solidifies after the ejection, thereby achieving extremely quick fixation of ink. Therefore this technique gives high quality of recorded images independently of the kind of recording paper used. The solid ink, however, has the disadvantages that the life of a recording head is adversely affected by required head temperatures as high as 100° C.; much power is consumed for maintaining the head temperature; and the apparatus is necessarily large in size. Furthermore, the practical use of the solid ink is restricted because the viscosity of the liquefied ink has a lower limit even at a higher heating temperature, which leads to lower frequency responsiveness.

On the other hand, an ink for ink-jet recording is proposed which contains less or no water, and employs a low-viscosity organic solvent as a medium for dissolving or dispersing a dye. Such a solvent includes alkyl ethers such as ethylene glycols, esters, pyrrolidones, lactones, and cyclic carbonates. The recording liquid which employs such an organic solvent as the medium permeates rapidly into plain paper and naturally exhibits high fixability. In order to prevent running and strike-through of the ink and to keep the printed image quality by adjustment of the ink formulation, measures are taken such that a solid component like a wax and a polymeric compound is added to the ink with the dye component, or that a binder component is added together with the pigment-dispersing resin.

In such methods, it is important that the rate of drying by evaporation and permeation of the constituting medium after ink deposition on a recording medium needs to be well balanced with the rate of increase of ink viscosity in order to obtain satisfactory fixability and image quality. In most cases, however, the ink fixability is low or the image quality is low with such measures.

In any of the above cases, addition of a binder component disadvantageously increases ink viscosity to lower the response frequency of ejection, or lowers responsiveness of ejection at the start of the recording owing to drying and viscosity increase of the ink at the tip of the nozzle. Therefore the addition of a binder is considered to be impractical.

SUMMARY OF THE INVENTION

The present invention intends to provide an aqueous ink which is satisfactory both in ink fixability and printed image quality, and to solve the aforementioned problems that are not solved by addition of a known water-soluble resin of prior art.

To achieve the above object, the present invention provides an ink containing a coloring material and an aqueous liquid medium for solving or dispersing the coloring material, the liquid medium having a lower critical consolute temperature (Tc) to cause phase separation at a temperature in the range of from 40 to 100° C.

The ink of the present invention contains preferably a polymeric compound giving a lower critical consolute temperature in the liquid medium, the polymeric compound being a copolymer having as a monomer unit an N-alkyl-substituted acrylamide. Otherwise, the liquid medium contains a solvent which is preferably a compound giving a lower critical consolute temperature.

The present invention provides further an ink-jet recording method which conducts recording by ejecting ink droplets through an orifice of a recording head onto a recording medium by use of the aforementioned ink.

The ink-jet recording is practiced in the present invention as follows:

1) an ink is ejected in the form of liquid droplets by action of thermal energy provided to the ink, and 2) at the time of recording, the recording medium is kept at a temperature higher than the lower critical consolute temperature of the liquid medium of the ink, or otherwise 3) at the time of recording, the recording head is kept at a temperature lower than the lower critical consolute temperature of the liquid medium of the ink, and the recording medium is kept at a temperature higher than the lower critical consolute temperature.

The present invention further provides a recording unit having an ink container for holding an ink, and a head for ejecting the ink as ink droplets, the ink being the aforementioned one of the present invention. The head of the recording unit ejects ink by action of thermal energy given to the ink.

The present invention further provides an ink cartridge having an ink container for holding ink, the ink being the aforementioned ink of the present invention.

The present invention further provides an ink-jet recording apparatus having an ink container for holding an ink, and a recording unit having a head for ejecting the ink as ink droplets, the ink being the aforementioned one of the present invention. The recording apparatus has a head for ejecting the ink as liquid droplets, and a means for heating a recording medium.

The present invention still further provides an ink-jet recording apparatus having a recording unit for ejecting droplets of an ink, an ink cartridge having an ink container for holding the ink, an ink supplying device for supplying the ink from the ink cartridge to the recording unit, the ink being the aforementioned ink of the present invention. The recording unit has a head for ejecting the ink as liquid droplets, and a means for heating a recording medium.

DETAILED DESCRIPTION OF THE PREFERRED EMBODIMENTS

Figure 1:
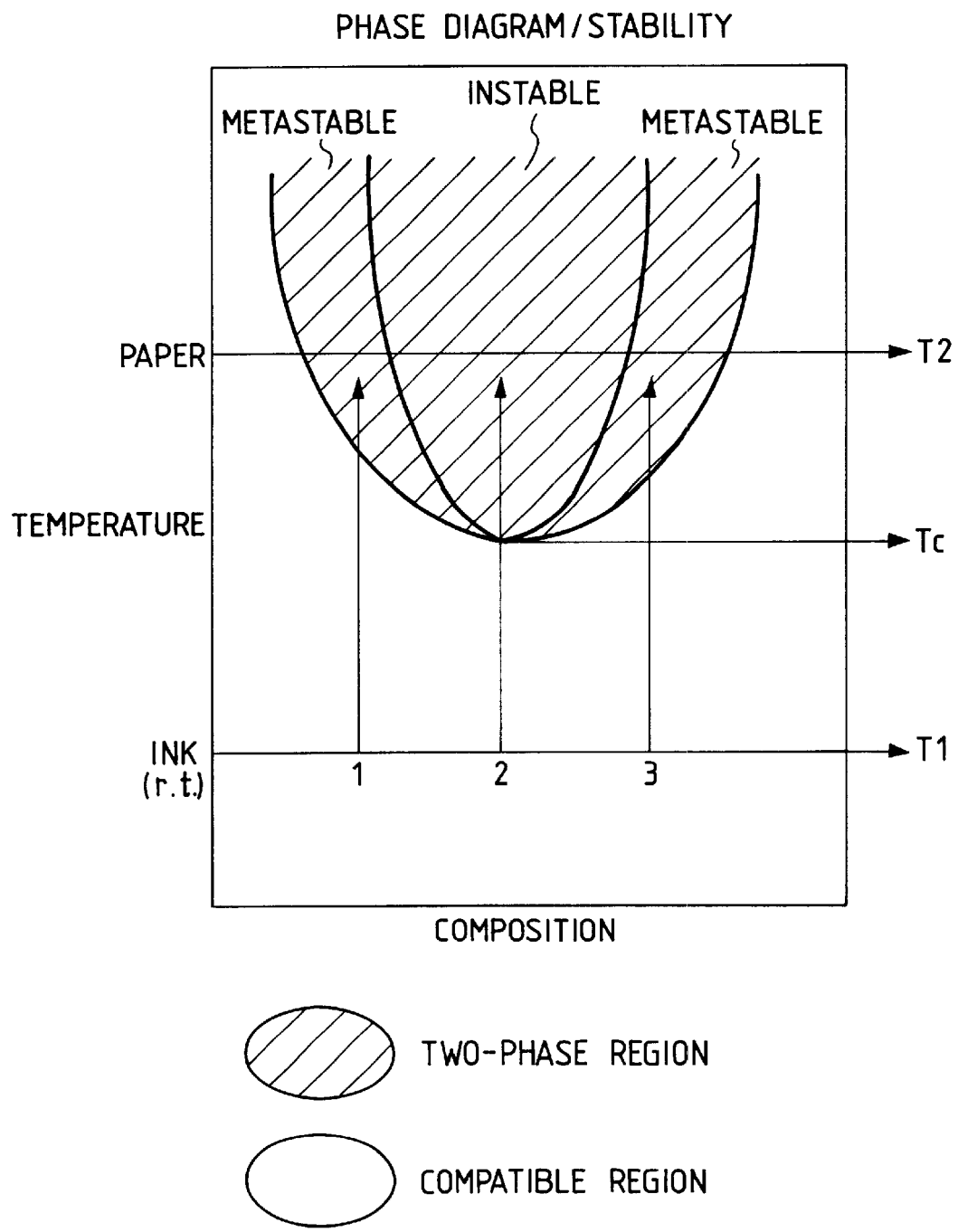
FIG. 1 is a phase equilibrium diagram for explaining the principle of the present invention.

In the present invention, an ink, which contains a polymeric compound having a lower critical consolute temperature, causes phase separation at an elevated temperature, thereby providing printed matter wherein the print has sharp edges without the Respective dots getting out of shape. The phase separation due to the lower critical consolute temperature, which is the underlying principle of the present invention, means a state of an ink in which many fine viscous liquid particles containing larger amounts of a polymer and a coloring material are dispersed in a less viscous liquid medium containing smaller amounts of the polymer and the coloring material. The concentrated fine liquid particles are less flowable, and tend to stay on a recording paper surface and are less liable to mix with each other by dispersion. Therefore it is presumed that deterioration of the quality of the print by excessive permeation of the coloring material is prevented even when the liquid medium contains a permeating material. This phenomenon can be brought about by action of heat. Therefore, in ink-jet recording where ejection energy is obtained by bubbling of the ink caused by heating, the phase separation proceeds by heat for bubbling and probably the ink droplets deposited on a recording paper surface are in a state of dispersion of microscopic liquid particles. In such a case, the heating of the recording paper sheet may be minimal, or is not required at all to obtain the above effects.

The underlying principle of the present invention is described by reference to a spinodal line. The spinodal line is explained in detail in published books: for example, Prigogine, and Defay: "Chemical Thermodynamics" (Japanese translation, Misuzu Shobo, Japan); P. Glansdorff and I. Prigogine: "Structure, Stability, and Fluctuations" (Wiley Interscience, London), etc. In a two-component system consisting of components A and B for example, the spinodal line is a border line between a metastable region and an unstable region in the phase equilibrium diagram as a function of the composition and the temperature of the system as shown FIG. 1. The rate of phase separation is known to differ greatly between the metastable region and the unstable region at the both sides of the border line. Assuming a temperature jump from T1 to T2, the composition 1 and the composition 3 are made to jump to a metastable region, and the composition 2 is made to jump to an unstable region. Starting from any of the compositions of 1 to 3, the system will reach a two-phase equilibrium state after lapse of sufficient time.

In the processes to the equilibrium, the metastable region is characterized in that supercooling tends to occur therein, the new phases are formed slowly by nucleation and growth thereof, while the unstable phase is characterized in that supercooling is less liable to occur, the new phase is formed instantaneously from the unstable state of the entire system by so-called spinodal decomposition, and the imperfect phase is formed quickly.

It is noteworthy that the speed of phase separation in the inside region of the spinodal line, i.e., in the unstable region, is 1000 times or more that in the metastable region.

The present invention is characterized by this phenomenon utilized in a specified ink system. The quick phase separation by spinodal decomposition causes:

(1) separation of solid components from the liquid,
(2) acceleration of permeation and evaporation of medium components from the dilute phase, and
(3) promotion of fixation of the coloring material component in the concentrated phase.

The reason why the spinodal decomposition causes quick phase separation is explained theoretically in detail in papers such as J. W. Cahn: The Journal of Chemical Physics 42, (1) 93 (1965), etc. The measurement results regarding the phenomenon in high polymer systems is reported in papers, e.g., J. J. Van Aartsen: European Polymer Journal, 6, 919 (1970), etc.

The constitution of the ink is described specifically based on the above principle.

The ink of the present invention is composed of a polymeric compound, a solvent, and a coloring material. The ink of the present invention is characterized by the factors of the polymer-solvent system, the composition thereof, T1, Tc, and T2.

The particularly preferred polymeric compound for the ink of the present invention is a water-soluble polymeric compound which has many hydrogen-bonding groups in the molecule, and causes phase separation sharply. The examples are N-alkyl-substituted acrylamides which are reported by S. Ito, et al. as polymeric compound exhibiting thermally reversible properties (Research Institute for Polymers and Textiles, Agency of Industrial Science and Technology (Japan): Research Report No. 144 (1984)). Specific examples thereof include poly(N-ethyl-acrylamide), poly(N-n-propyl-acrylamide), poly(N-n-propyl-methacrylamide), poly(N-isopropyl-acrylamide), poly(N-isopropyl-methacrylamide), poly(N-cyclopropyl-acrylamide), poly(N-cyclopropyl-methacrylamide), poly(N,N-diethyl-acrylamide), poly(N,N-diethyl-methacrylamide), etc. Other examples include poly(N-acrylpyrrolidone), poly(N-acrylpiperidine), and copolymers thereof, alternate copolymer of polyisobutyl vinyl ether with maleic anhydride, poly(2-methyl-5-vinylpyridine), poly(vinyl alcohol), poly(N-vinylpyrrolidone), poly(N-vinyl-succinic acid), poly(vinylsulfonic acid); alkyl esters of (meth)acrylic acid such as poly(n-butyl methacrylate), poly(dodecyl methacrylate), poly(n-hexyl methacrylate), poly(methyl methacrylate), and poly(n-octyl methacrylate); poly(oxyethylene), poly(tetrahydrofuran), amylopectin, amylose, poly(vinyl acetate), poly(propylene glycol), and the like. Of these polymeric compounds, N-alkyl-substituted acrylamide type polymers are especially preferred since they give sharp phase transfer.

For the ink of the present invention, relatively low molecular solid compounds below are also useful: the compounds including fatty acids such as lauric acid, and stearic acid; higher alcohols such as cetyl alcohol, and stearyl alcohol; diols such as 1,6-hexanediol, 1,10-decanediol, 1,12-dodecanediol, and 2,2-dimethylolpentane; esters such as ethylene carbonate, 12-hydroxystearyl monoglyceride, and glycerin monostearate; and natural waxes such as paraffin wax, and candelilla wax.

The solvent employed is selected from substances which have low volatility, low viscosity, and high stability, and give a lower critical consolute temperature in combination with the above polymeric compound or the solid compound. Examples of the solvent include water, ethylcarbitol, methylcellosolve, tetrahydronaphthalene, t-butanol, ethanol, isopropyl alcohol, methanol, n-propanol, n-amyl alcohol, urea, dioxane, diethylene glycol diethyl ether, butanone, acetate buffer, NaCl/water, KBr/water, KCl/water, NaBr/water, $KNO_3$/water, $K_2SO_4$/water, $MgSO_4$/water, ethylene carbonate, propylene carbonate, higher fatty acids, fatty acid amides, dimethylol-propionic acid, hydrocarbon waxes, and so forth.

Preferred combinations of the polymer/solvent system include mixtures of water with a polymer of N-ethyl-acrylamide, N-n-propyl-acrylamide, N-n-propyl-methacrylamide, N-isopropyl-acrylamide, N-isopropyl-methacrylamide, N-cyclopropyl-acrylamide, N-cyclopropyl-methacrylamide, N-N-diethyl-acrylamide, N,N-diethyl-methacrylamide, N,N-acryl-pyrrolidone, or N-acrylpiperidine, or a copolymer thereof; mixtures of water and NaCl with an alternate copolymer of poly(isobutyl vinyl ether) and maleic anhydride, mixtures of polyvinyl alcohol, t-butanol, and water, mixtures of polyvinyl alcohol, ethanol, and water, mixtures of polyvinyl alcohol, methanol, and water, mixtures of polyvinyl alcohol, isopropanol, and water, mixtures of polyvinyl alcohol, n-propanol, and water, mixtures of polyvinyl alcohol, NaCl, and water, mixtures of poly(N-vinylpyrrolidone), NaCl, and water, mixtures of poly(N-vinylsuccinamic acid), NaCl, and water; mixtures of polyvinylsulfonic acid, one of KBr, KCl, NaBr and NaCl, and water, mixtures of poly-n-butyl methacrylate and methylcellosolve, mixtures of poly(dodecyl methacrylate) and n-amyl alcohol, mixtures of poly(n-hexyl methacrylate), urea, and water, mixtures of poly(methyl methacrylate), dioxane, and water, mixtures of polyoxyethylene, and diethylene glycol diethyl ether; mixtures of polyoxyethylene, one of KCl, NaCl, $KNO_3$, $MgSO_4$, and $K_2SO_4$, and water, mixtures of polytetrahydrofuran and butanone, mixtures of amylopectin and water; and mixtures of amylose, KCl, and water.

The coloring material employed in the present invention includes water-soluble dyes such as direct dyes, acid dyes, food dyes, basic dyes, reactive dyes, vat dyes, etc., and dispersions of a pigment such as dyes of azo type, phthalocyanine type, quinacridone type, anthraquinone type, dioxazine type, indigo or thioindigo type, perynone type, isoindolinone type, azomethine type, carbon black, and the like. The pigment, when used as the coloring material, needs to be treated preliminarily with a dispersing agent for dispersion. A suitable dispersing agent for aqueous dispersion is an addition polymerization type of polymer dispersing agent like the one disclosed in Japanese Patent Application Laid-Open No. 56-147863. The dispersion may be conducted by a method like the one disclosed in Japanese Patent Application Laid-Open No. 2-255875. The coloring material is used in an amount of from 0.5 to 10% by weight of the ink generally in the present invention, but the amount is not limited thereto, provided that a sufficient coloring density is given on a recording medium.

Further the following points need to be considered in selection of the above materials:

1. The material is soluble homogeneously in the solvent constituting the spinodal decomposition system of the dispersing polymer.

2. The dispersing polymer and the polymer constituting the spinodal decomposition system need not be compatible with each other, but are required not to separate into two phases in the solvent system.

A further solvent may be additionally incorporated. The additional solvent which exhibits moisture retention property includes: ethylene glycol, diethylene glycol, triethylene glycol, tripropylene glycol, glycerol, 1,2,4-butanetriol, 1,2,6-hexanetriol, 1,2,5-pentanetriol, 1,2-butanediol, 1,3-butanediol, 1,4-butanediol, dimethylsulfoxide, diacetone alcohol, glycerin monoallyl ether, propylene glycol, butylene glycol, polyethylene glycol 300, thiodiglycol, N-methyl-2-pyrrolidone, 2-pyrrolidone, γ-butyrolactone, 1,3-dimethyl-2-imidazolidinone, sulfolane, trimethylolpropane, trimethylolethane, neopentylglycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether, dipropylene glycol monomethyl ether, β-dihydroxyethylurea, urea, acetonylacetone, pentaerythritol, 1,4-cyclohexanediol, and so forth. The additional solvent which enhance permeation includes: hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monomethyl ether, dipropylene glycol monopropyl ether, dipropylene glycol monobutyl ether, tripropylene glycol monomethyl ether, glycerin monoacetate, glycerin diacetate, glycerin triacetate, ethylene glycol monomethyl ether acetate, diethylene glycol monomethyl ether acetate, cyclohexanol, 1,2-cyclohexanediol, 1-butanol, 3-methyl-1,5-pentanediol, 3-hexene-2,5-diol, 2,3-butanediol, 1,5-pentanediol, 2,4- pentanediol, 2,5-hexanediol, and so forth. The additional solvent which has volatility includes: ethanol, n-propanol, 2-propanol, 1-methoxy-2-propanol, furfuryl alcohol, tetrahydrofurfuryl alcohol, and so forth.

The contents of the materials in the ink are adjusted as below.

The polymeric compound exhibiting the lower critical consolute temperature is used preferably and effectively in a range of from 0.5 to 5% by weight. With a smaller amount, the effect of phase separation is not clearly exhibited, while with a larger amount, the viscosity of the ink rises and formation of liquid droplets and ejection of the droplets are clearly adversely affected.

The concentration of the coloring material depends on the coloring power, and is preferably in the range of from 0.5 to 5% by weight.

The main medium for constituting the phase separation system in combination with the polymer is contained in an amount ranging from about 50 to about 80% of the entire medium. A solvent for moisture retention is contained as the balance.

The ink of the present invention is mainly constituted of the material mentioned above. Additionally, a dispersing agent, a surfactant, a viscosity-controlling agent, surface tension-adjusting agent, a fluorescent whitener, an antioxidant, anti-mildew agent, a pH controller, etc. may be incorporated, if necessary, within the range that the object of the present invention is not hindered.

In the case where a pigment is used as the coloring material, the ink of the present invention is produced as below.

1. The pigment is dispersed with a suitable dispersing polymer in a dispersion medium. The dispersion medium is a solvent or a solvent system which is used later for the ink. However, different solvents may be used supplementarily for the dispersion operation.

2. A solution of a polymeric compound which constitutes the spinodal decomposition system is added to the above dispersion.

3. A solvent for composition adjustment, an additive for ink properties, and other additives are added to the above dispersion to prepare the final composition.

When a droplet of the ink employing the spinodal decomposition system of the present invention is ejected from a recording head at a temperature T1 (lower than the critical temperature Tc) onto a recording paper sheet, the temperature of the ink droplet rises to T2 (T2 being usually higher than room temperature, T2>Tc). This temperature rise brings the system into the unstable region shown in the phase equilibrium diagram, thereby new phases are formed throughout the system (namely, a liquid film formed from the deposited liquid droplet). The formed new phases are usually separated into a concentrated phase and a dilute phase. The dilute phase, which is mainly constituted of a solvent, readily evaporates and simultaneously penetrates into the recording paper sheet. On the other hand, the concentrated phase tends to stay on the surface of the recording paper sheet, whereby the coloring material advantageously is fixed on the surface without penetration into the paper sheet.

In such a manner, the ink of the present invention, when its temperature is raised, becomes unstable quickly and forms two phases of a concentrated liquid and a dilute liquid. This principle is suitably employed in ink-jet recording with an ink which is initially a low-viscosity solution.

The ink of the present invention is suitably applied to a usual ink-jet recording method, especially to an ink-jet method which ejects ink by action of bubbling caused by heat energy.

The lower critical consolute temperature of the polymeric compound can be adjusted by selection of the kind, molecular weight, and addition amount of the polymeric compound having a lower critical consolute temperature. It can also be adjusted by the kind and amount of the solvent used and addition of a suitable inorganic salt.

Figure 2:
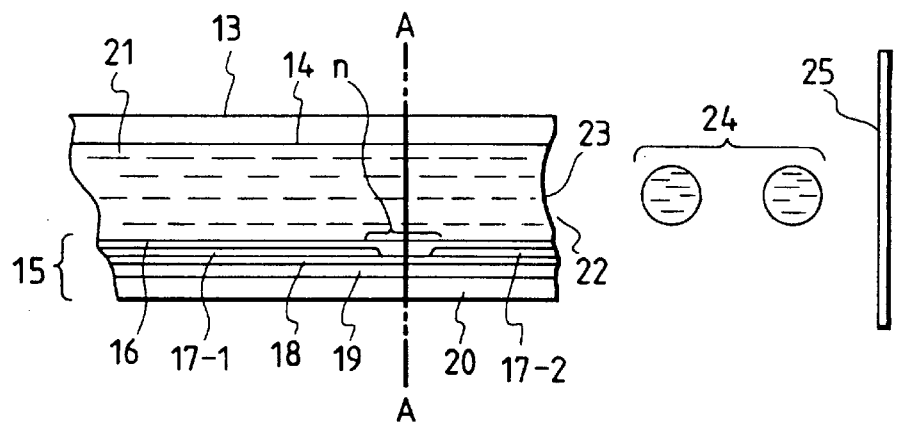
FIG. 2 is a sectional view of a recording head of the present invention.
Figure 3:
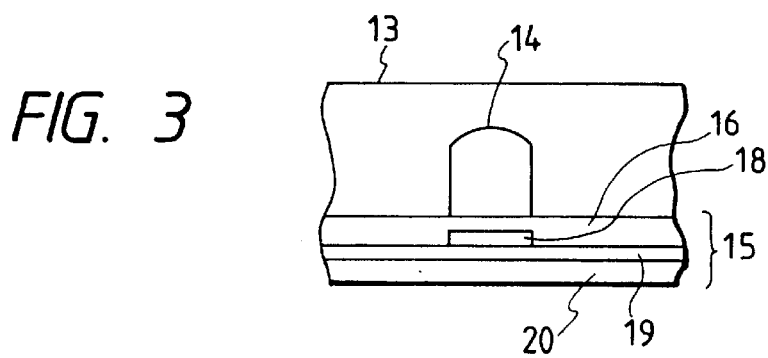
FIG. 3 is a sectional view of the recording head at the line A—A in FIG. 2.

One example of the ink-jet recording apparatus of the present invention is explained below. FIGS. 1, 2, and 3 illustrate construction of a head which is the essential part of the apparatus.

In the drawings, the head 13 is constructed by bonding a plate of glass, ceramics, or plastics having grooves 14 for ink flow with a heat-generating head 15 for thermal recording. The heat-generating head 15 is constituted of a protection layer 16 formed of silicon oxide or the like, aluminum electrodes 17-1, 17-2, a heat-generating resistance layer 18 made of nichrome or the like, a heat-accumulating layer 19, and a heat-radiating substrate plate 20 made of alumina or the like.

The ink 21 fills an ejection orifice (fine nozzle) 22, and has a meniscus 23 formed by a pressure P.

On application of an electric signal information to the electrodes 17-1, 17-2 of the head, the region denoted by a symbol "n" on the heat-generating head 15 generates heat abruptly to form bubbles in the ink 21 on the region, the pressure of the bubble pushes out the meniscus 23 to eject ink from the orifice 22 in a shape of droplets 24. The ejected ink droplets travel toward a recording medium 25.

Figure 4:
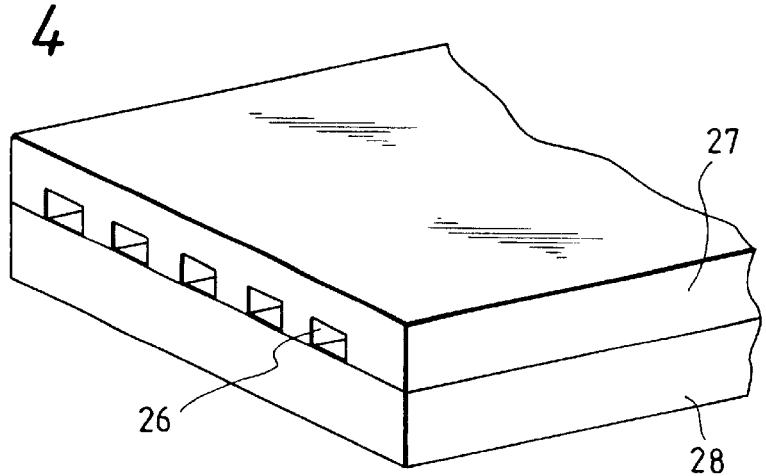
FIG. 4 illustrates the external appearance of a multiple head having a plurality of heads of FIG. 2 in juxtaposition.

FIG. 4 shows an external appearance of a multiple head having in juxtaposition a plurality of the head as shown in FIG. 2. The multiple head is formed by bonding a glass plate 27 having multiple grooves 26 with the heat-generating head 28 like the one shown in FIG. 2.

FIG. 3 is a sectional view of the head 13 along the ink flow path at the line A—A in FIG. 2.

The ink in the present invention can be maintained at an operating temperature by heating the substrate plate 20 to keep the entire head at a constant temperature, or by a like method.

Figure 5:
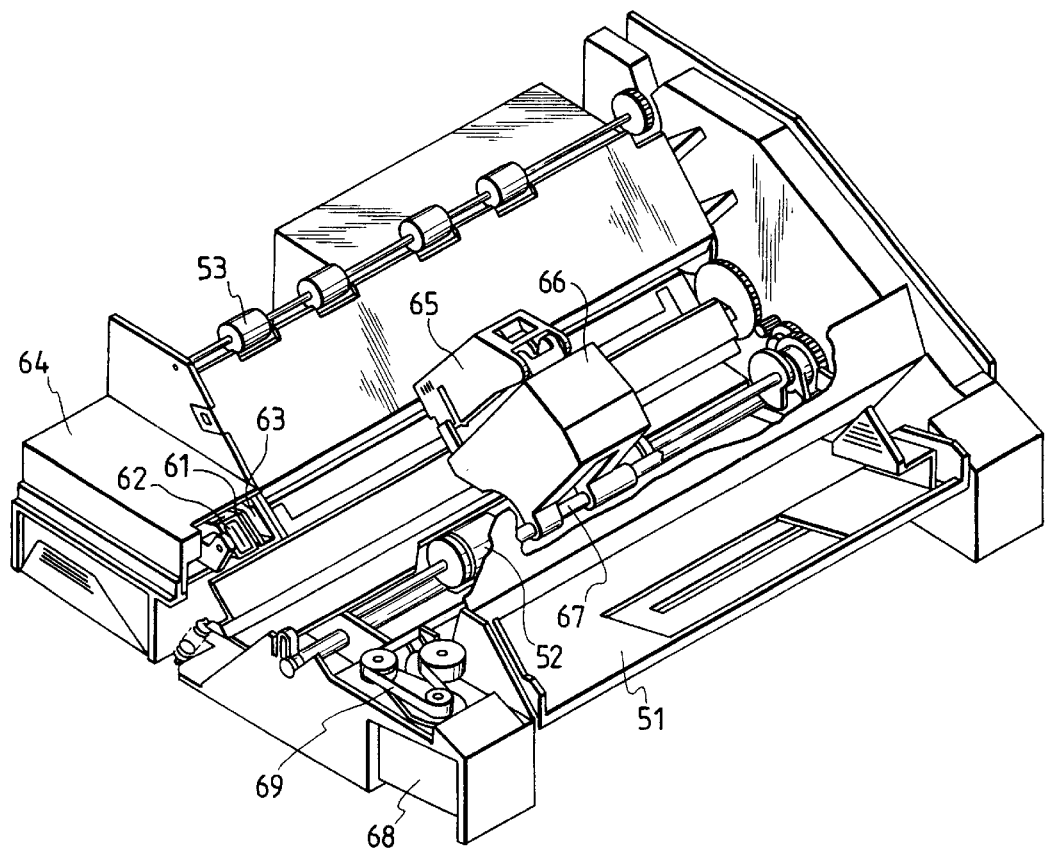
FIG. 5 is a perspective view of an ink-jet recording apparatus having the head of the present invention mounted thereon.

FIG. 5 illustrates an example of the ink-jet recording apparatus having such a head mounted thereon. In FIG. 5, a blade 61 as a wiping member is held at one end of the blade by a blade-holding member, forming a fixed end in a shape of a cantilever. The blade 61 is placed at a position adjacent to the recording region of the recording head, and, in this example, is held so as to protrude into the moving path of the recording head. The cap 62 is placed at a home position adjacent to the blade 61, and is constituted such that it moves in the direction perpendicular to the moving direction of the recording head to come into contact with the ejection nozzle face to cap the nozzle. An ink absorbent 63 is placed at a position adjacent to the blade 61, and is held so as to protrude into the moving path of the recording head in a manner similar to that of the blade 61. The blade 61, the cap 62, and the absorbent 63 constitute an ejection recovery device 64. The blade 61, and the absorbent 63 serve to remove off water, dust, and the like from the face of the ink ejection nozzle. A recording head 65 has an energy-generating means for the ejection, and conducts recording by ejecting the ink onto a recording medium opposite to the ejection nozzle face. A carriage 66 is provided for supporting and moving the recording head 65. The carriage 66 is engaged slidably with a guide rod 67. A portion of the carriage 66 is connected (not shown in the drawing) to a belt 69 driven by a motor 68, so that the carriage 66 is movable along the guide rod 67 to the recording region of the recording head 65 and the adjacent region thereto.

A paper delivery device 51 for delivery of a recording medium and a paper delivery roller 52 driven by a motor (not shown in the drawing) delivers a recording medium to the position opposite to the ejection nozzle face of the recording head, and the recording medium is delivered with the progress of the recording to a paper discharge device provided with paper-discharging rollers 53.

Figure 8A:
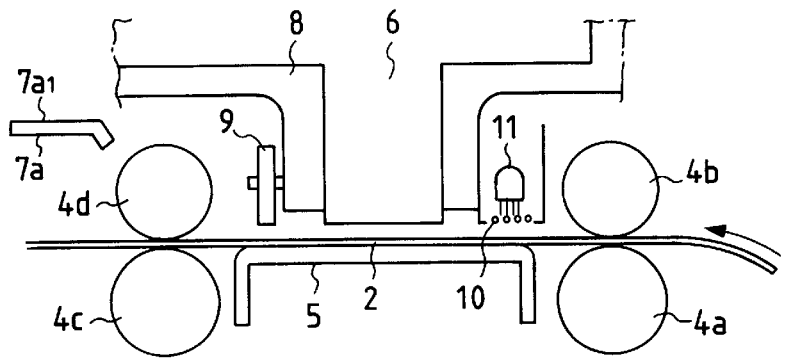
FIGS. 8A to 8C illustrate schematically the structure of printers equipped with a heating means. The heating means is an infrared heater in FIG. 8A; a sheet-shaped heat generator in FIG. 8B; and heating rollers in FIG. 8C.
Figure 8B:
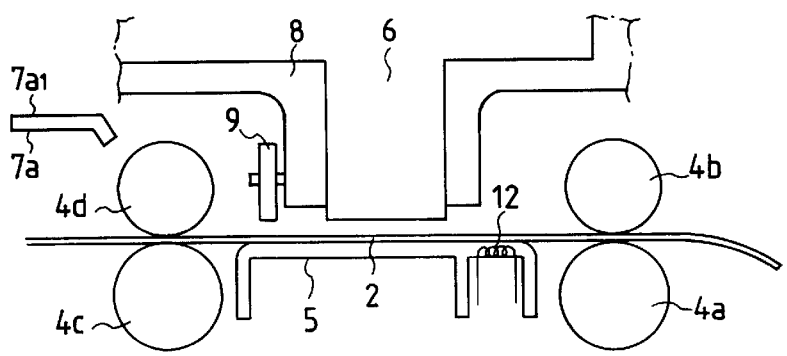
Figure 8C:
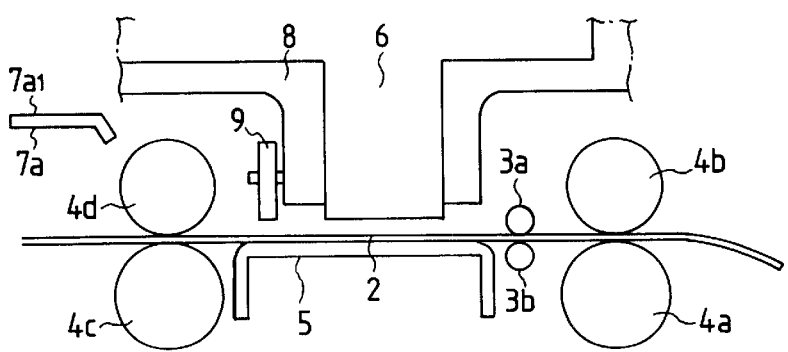

The recording paper sheet can be held at a temperature higher than room temperature in the following manner: (1) as shown in FIG. 8A, an infrared heater 10 and a fan 11 is provided above or below the paper delivery route to heat the paper with radiation heat; (2) as shown in FIG. 8B, a plate-shaped heat-generating member 12 is provided in contact with the paper to heat it directly; or (3) as shown in FIG. 8C, a heater is provided in a paper delivery roller (3a or 3b) to heat the paper by heat conduction.

In the above constitution, when the recording head 65 returns to the home position on completion of recording, the cap 62 of the ejection-recovery device 64 is positioned out of the moving path of the recording head 65, and the blade 61 is allowed to protrude to the moving path. Thereby, the ejection nozzle face of the recording head 65 is wiped. To cap the ejection face of the recording head 65, the cap 62 protrudes toward the moving path of the recording head to come into contact with the ejection nozzle face.

When the recording head 65 is made to move from the home position to the record-starting position, the cap 62 and the blade 61 are at the same position as in the above-mentioned wiping step, so that the ejection nozzle face of the recording head 65 is wiped also in this movement. The recording head is moved to the home position not only at the completion of the recording and at the time of ejection recovery, but is also moved at predetermined intervals during recording from the recording region. The nozzle is wiped by such movement.

Figure 6:
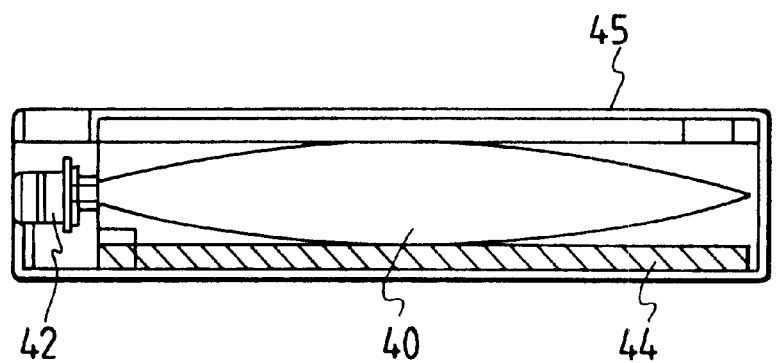
FIG. 6 is a sectional view of an ink cartridge for supplying an ink through an ink-supplying tube to the above head.

FIG. 6 is a sectional view of an example of the ink cartridge 45 which holds an ink to be supplied through an ink supplying member such as a tube. The ink container 40, an ink bag for example, contains an ink to be supplied, and has a rubber plug 42 at the tip. Insertion of a needle (not shown in the drawing) into the plug 42 enables supply of the ink from the ink bag 40. A waste-ink absorbent 44 serves to absorb a waste ink. The liquid-contacting surface of the ink container is preferably made of polyolefin, particularly preferably made of polyethylene in the present invention.

Figure 7:
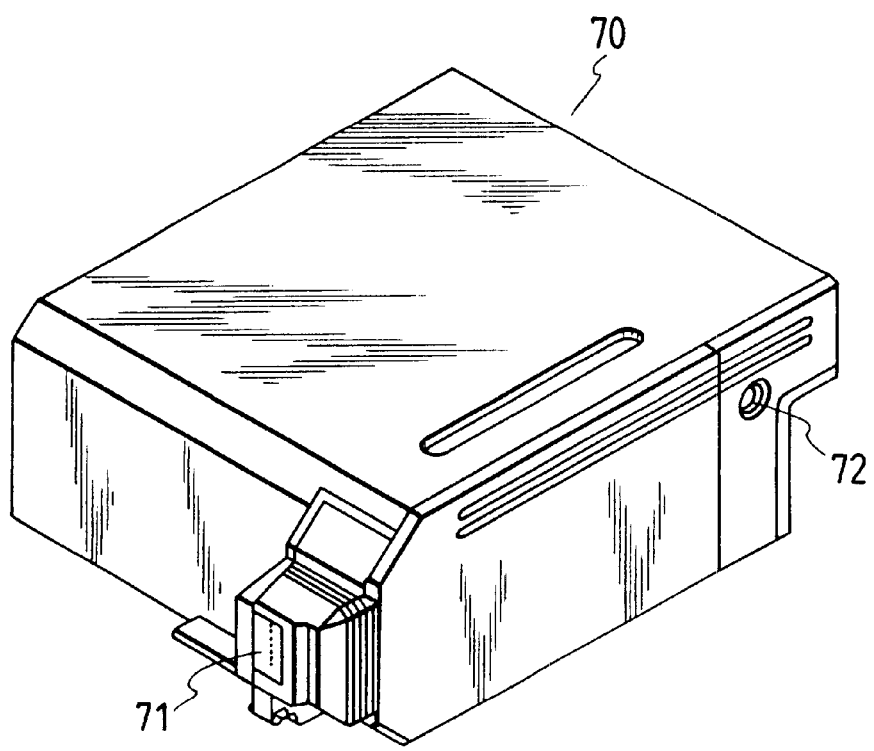
FIG. 7 illustrates an external appearance of the ink-jet recording apparatus in which the head and the ink cartridge are integrated.

The ink-jet recording apparatus used in the present invention is not limited to the above-mentioned one which has separately a head and an ink cartridge. Integration thereof as shown in FIG. 7 may suitably be employed. In FIG. 7, a recording unit 70 houses an ink holding member such as an ink absorbent, and the ink in the absorbent is ejected from a plurality of orifices of a head 71. The ink absorbent is made preferably of polyurethane, cellulose, or polyvinyl acetal. An air-communication opening 72 is provided to communicate the interior of the cartridge with the open air. The recording unit 70 may be used in place of the recording head shown in FIG. 5, and is made to be readily mountable to and demountable from the carriage 66.

The present invention is described specifically by reference to Examples and Comparative Examples.

EXAMPLES 1–5, AND COMPARATIVE EXAMPLES 1–4

Table 1 shows water-soluble polymers employed as the compounds which have a lower critical consolute temperature in an aqueous system with the molecular weights and the lower critical consolute temperatures thereof.

The inks of the present invention were prepared respectively by using the above compound and mixing the components shown in Tables 2 to 5. In preparation of the ink, firstly, the polymeric compound was dissolved at a concentration ranging from 1 to 5%. To this aqueous solution, water, an organic solvent, and a dye, and if necessary a surfactant were added in the named order in predetermined amounts to obtain a desired concentration of the polymer. The mixture was stirred for 5 hours, and then filtered under pressure through a membrane filter having a pore size of 0.22 $\mu$m (trade name: Fluoro Pore Filter, made by Sumitomo Electric Industries, Ltd.). Four colors of inks, black, yellow, magenta, and cyan, were prepared for each of the Examples of the present invention.

Tables 2 to 5 show the compositions of the four colors of inks. In the tables, the numerals denote parts by weight of each of the components.

Inks of Comparative Examples 1 to 4 were prepared in the same manner as in Examples 1 to 4 except that the water-soluble polymers were not used by replacing the polymer with water.

Table 6 shows the viscosities $\eta$ (cps) of the inks at 25° C., the operating temperature (Th), and the paper temperature Tp in the Examples.

An ink-jet recording apparatus was used which has four bubble jet recording heads juxtaposed in the direction of the head scanning, each head having 256 nozzles in a density of 400 dpi. The heads were charged with the aforementioned inks, and recording testing was conducted.

The temperature of the recording head was controlled to correspond to the operating temperature Th of the ink of the example. The surface temperature of the recording paper was controlled to become Tp at the time of the recording by a heater in the platen roll. The amount of the ink for fully solid printing was 10 nl/mm$^2$ for each color.

The printed matter was tested for the properties of color development, fixation, and occurrence of running of ink by the methods below. Table 7 shows the results of the tests for the three items.

(1) Fixability

Solid printing in blue color was conducted by double printing of a cyan ink and a magenta ink at 100% duty respectively. After 10 seconds and 30 seconds, the printed portion was rubbed with filter paper (trade name No. 5C, made by Toyo Roshi K.K.), and evaluated according to the criteria below:

| | |
|---|---|
| Excellent: | No smearing after 10 seconds, |
| Good: | Slight smearing after 10 seconds but no smearing after 20 seconds, |
| Fair: | Slight smearing after 20 seconds but no smearing after 30 seconds, |
| Poor: | Smearing after 30 second |

(2) Color Development

The reflective density at the 100% solid printed portion of each color was measured by use of a reflective density meter (MacBeth RD-918).

(3) Printed Letter Blurring

Character printing was conducted with black ink, and further thereon, solid printing was conducted with yellow ink at 100% duty, and the quality of the printed character was evaluated, and rated on the criteria below.

| | |
|---|---|
| Excellent: | No blurring, |
| Good: | No blurring but slight feathering observed, |
| Fair: | Blurring observed and outline of character being somewhat irregular, |
| Poor: | Blurring being significant and characters being not decipherable |

(The ones rated as "Excellent" and "Good" are practically useful.)

The results of Examples 1 to 5 and Comparative Examples 1 to 4 show that the ink and the ink-jet recording method of the present invention gives excellent recorded images with printing suitability on plain paper, while in the Comparative Examples color development, blurring of printed images, and ink fixation are all unsatisfactory.

The ink of the present invention, which employs a polymeric compound having a lower critical consolute temperature, is a homogeneous solution at room temperature. The liquid medium of the ink separates into phases at a temperature in the range of from 40 to 100° C. such that the polymeric compound having a lower critical consolute temperature in an aqueous system deposits in a dispersed state in the recording liquid, Thereby, excellent recorded images are obtained with printing suitability on plain paper. Thus high-quality recording can be achieved with the ink of the present invention in color recording even on plain paper with satisfactory fixability.

TABLE 1

| Symbol | Phase-changing polymer | Molecular weight | Lower critical consolute temperature |
|---|---|---|---|
| A | Poly-N-isopropyl-methacrylamide | 12000 | 44° C. |
| B | Poly-n-hexyl-methacrylamide | 20000 | 27° C. |
| C | Polyoxyethylene | 8000 | 54° C. |
| D | Poly-N-vinyl-pyrrolidone | 18000 | 25° C. |
| E | Poly-N,N-ethylmethyl acrylamide | 15000 | 60° C. |

TABLE 2

Composition of Black Ink in Examples 1–5

| | Example No. | | | | |
|---|---|---|---|---|---|
| | 1 | 2 | 3 | 4 | 5 |
| Projet Fast Black 2 Liquid H112287 * | 3.0 | 3.0 | 3.0 | 3.0 | 3.0 |
| Ethylene glycol | 7.0 | 7.0 | 7.0 | 7.0 | 7.0 |
| Glycerol | 5.0 | 5.0 | 5.0 | 5.0 | 5.0 |
| Isopropyl alcohol | 3.0 | 3.0 | 3.0 | 3.0 | 3.0 |
| Acetylenol EH ** | 0.5 | 0.5 | 0.5 | 0.5 | 0.5 |
| Phase-changing polymer A | 1.5 | | | | |
| Phase-changing polymer B | | 1.5 | | | |
| Phase-changing polymer C | | | 1.5 | | |
| Phase-changing polymer D | | | | 2.0 | |
| Phase-changing polymer E | | | | | 1.0 |
| Urea | | 12.0 | | | |
| NaCl | | | | 3.2 | |
| KCl | | | 7.4 | | |
| Water | 80.0 | 80.0 | 80.0 | 79.5 | 80.5 |

* Black dye made by ICI Co.
** Surfactant made by Kawaken Fine Chemical K.K.

TABLE 3

Composition of Yellow Ink in Examples 1–5

| | Example No. | | | | |
|---|---|---|---|---|---|
| | 1 | 2 | 3 | 4 | 5 |
| C.I. Direct Yellow 86 | 2.0 | 2.0 | 2.0 | 2.0 | 2.0 |
| Ethylene glycol | 7.0 | 7.0 | 7.0 | 7.0 | 7.0 |
| Glycerol | 5.0 | 5.0 | 5.0 | 5.0 | 5.0 |
| Isopropyl alcohol | | | | 3.0 | |
| Acetylenol EH | 0.80 | 0.30 | 0.10 | 0.05 | 0.80 |
| Phase-changing polymer A | 1.5 | | | | |
| Phase-changing polymer B | | 1.5 | | | |
| Phase-changing polymer C | | | 1.5 | | |
| Phase-changing polymer D | | | | 2.0 | |
| Phase-changing polymer E | | | | | 1.0 |
| Urea | | 12.0 | | | |
| NaCl | | | | 3.2 | |
| KCl | | | 7.4 | | |
| Water | 80.0 | 80.0 | 80.0 | 79.5 | 80.5 |

TABLE 4

Composition of Magenta Ink in Examples 1–5

| | Example No. | | | | |
|---|---|---|---|---|---|
| | 1 | 2 | 3 | 4 | 5 |
| C.I. Acid Red 35 | 2.0 | 2.0 | 2.0 | 2.0 | 2.0 |
| Ethylene glycol | 7.0 | 7.0 | 7.0 | 7.0 | 7.0 |
| Glycerol | 5.0 | 5.0 | 5.0 | 5.0 | 5.0 |
| Isopropyl alcohol | | | | 3.0 | |
| Acetylenol EH | 0.80 | 0.30 | 0.10 | 0.05 | 0.80 |
| Phase-changing polymer A | 1.5 | | | | |
| Phase-changing polymer B | | 1.5 | | | |
| Phase-changing polymer C | | | 1.5 | | |
| Phase-changing polymer D | | | | 2.0 | |
| Phase-changing polymer E | | | | | 1.0 |
| Urea | | 12.0 | | | |
| NaCl | | | | 3.2 | |
| KCl | | | 7.4 | | |
| Water | 80.0 | 80.0 | 80.0 | 79.5 | 80.5 |

TABLE 5

Composition of Cyan Ink in Examples 1–5

| | Example No. | | | | |
|---|---|---|---|---|---|
| | 1 | 2 | 3 | 4 | 5 |
| C.I. Direct Blue 199 | 2.0 | 2.0 | 2.0 | 2.0 | 2.0 |
| Ethylene glycol | 7.0 | 7.0 | 7.0 | 7.0 | 7.0 |
| Glycerol | 5.0 | 5.0 | 5.0 | 5.0 | 5.0 |
| Isopropyl alcohol | | | | 3.0 | |
| Acetylenol EH | 0.80 | 0.30 | 0.10 | 0.05 | 0.80 |
| Phase-changing polymer A | 1.5 | | | | |
| Phase-changing polymer B | | 1.5 | | | |
| Phase-changing polymer C | | | 1.5 | | |
| Phase-changing polymer D | | | | 2.0 | |
| Phase-changing polymer E | | | | | 1.0 |
| Urea | | 12.0 | | | |
| NaCl | | | | 3.2 | |
| KCl | | | 7.4 | | |
| Water | 80.0 | 80.0 | 80.0 | 79.5 | 80.5 |

TABLE 6

| | Ink viscosity | Th | Tp |
|---|---|---|---|
| Example | | | |
| 1 | 3.0 cps | 30° C. | 50° C. |
| 2 | 2.8 cps | 25° C. | 50° C. |
| 3 | 3.2 cps | 30° C. | 70° C. |
| 4 | 2.5 cps | 25° C. | 25° C. |
| 5 | 3.3 cps | 25° C. | 25° C. |
| Comparative Example | | | |
| 1 | 2.5 cps | 30° C. | 50° C. |
| 2 | 2.4 cps | 25° C. | 50° C. |
| 3 | 2.6 cps | 30° C. | 70° C. |
| 4 | 2.0 cps | 25° C. | 25° C. |

TABLE 7

| | OD (BK) | OD(Y) | OD(M) | OD(C) | Fix-ability | Blurring |
|---|---|---|---|---|---|---|
| Example | | | | | | |
| 1 | 1.26 | 1.17 | 1.27 | 1.13 | Excellent | Excellent |
| 2 | 1.15 | 1.02 | 1.14 | 0.94 | Excellent | Good |
| 3 | 1.16 | 1.00 | 1.16 | 0.95 | Excellent | Good |
| 4 | 1.17 | 1.03 | 1.15 | 0.98 | Good | Good |
| 5 | 1.30 | 1.18 | 1.23 | 1.15 | Excellent | Excellent |

OD: Optical density

TABLE 8

| | OD (BK) | OD(Y) | OD(M) | OD(C) | Fix-ability | Blurring |
|---|---|---|---|---|---|---|
| Comparative Example | | | | | | |
| 1 | 1.05 | 0.80 | 1.06 | 0.82 | Excellent | Poor |
| 2 | 1.08 | 0.84 | 1.10 | 0.83 | Good | Fair |
| 3 | 1.10 | 0.84 | 1.12 | 0.85 | Fair | Fair |
| 4 | 1.05 | 0.86 | 1.05 | 0.88 | Excellent | Poor |

EXAMPLE 6

(Preparation of Pigment Liquid Dispersion)

The components below were mixed and warmed to 50° C. on a water bath to dissolve the resin component completely.

| | |
|---|---|
| Styrene/acrylic acid/butyl acrylate copolymer (Glass transition temperature: 74° C. acid value: 230, molecular weight: 6700) | 2 parts |
| Monoethanolamine | 0.5 parts |
| Deionized water | 80 parts |

To this solution, 15 parts of experimentally produced carbon black (MA-100, made by Mitsubishi Chemical Industries Ltd.) was added, and mixed preliminarily for 30 minutes. This mixture was subjected to dispersion treatment under the conditions below.

| | |
|---|---|
| Dispersion machine: | Sand grinder |
| Grinding medium: | Glass beads (1 mm diameter) |
| Packing ratio of grinding medium: | 50% by volume |
| Dispersion time: | 3 hours |

The dispersion was centrifuged at 12000 rpm for 20 minutes to eliminate coarse particles. The obtained dispersion was used in this Example.

(Preparation of Ink)

The components below were mixed and treated for dispersion.

| | |
|---|---|
| Above dispersion (Solid content: about 15%) | 30 parts |
| Polyvinyl alcohol (saponification degree: 85%, number-average molecular weight: 70,000) | 6.0 parts |
| t-butanol | 32 parts |
| Deionized water | 42.5 parts |

The obtained ink contained 4.5 parts of the dispersed pigment in a medium composed of polyvinyl alcohol, t-butanol, and water (6.0:32.0:42.5 by weight). The dispersion treatment was conducted at room temperature. After the final formulation treatment, the ink was kept at 20° C., and was subjected to printing test. The Tc of this ink was about 25° C.

EXAMPLE 7

(Preparation of Pigment Liquid Dispersion)

The components below were mixed to prepare a resin solution.

| | |
|---|---|
| Styrene/acrylic acid/ethyl acrylate copolymer (Glass transition temperature: 87° C., acid value: 1750, molecular weight: 11000) | 2.5 parts |
| Aminomethylpropanol | 0.5 parts |
| Deionized water | 79.0 parts |

To this resin solution, 13 parts of experimentally produced carbon black (MCF-88, made by Mitsubishi Chemical Industries Ltd.) was added, and a dispersion was prepared in the same manner as in Example 6. The solid matter content of the resulting dispersion was 16% by weight.

(Preparation of Ink)
The components below were mixed.

| | |
|---|---|
| Dispersion prepared above | 30 parts |
| Polyisobutyl vinyl ether/maleic anhydride copolymer (number-average molecular weight: 15,000) (solid matter) | 6.0 parts |
| Sodium chloride | 5.85 parts |
| Deionized water | 74.8 parts |

After the final formulation treatment, the ink was kept at 20° C., and was subjected to the test. The Tc of this ink was about 25° C.

EXAMPLE 8
(Preparation of Pigment Liquid Dispersion)
The components below were mixed.

| | |
|---|---|
| Methyl methacrylate/acrylic acid/hydroxyethyl methacrylate copolymer (Glass transition temperature: 86° C., acid value: 145 molecular weight: 7500) | 1.5 parts |
| Monoethanolamine | 0.5 part |
| Diethylene glycol diethyl ether | 47.5 parts |
| Water | 30 parts |

To this mixture, 15 parts of carbon black (S170, made by Degusa Co. was added, and a dispersion was prepared in the same manner as in Example 6. The solid matter content of the resulting dispersion was 15%.
(Preparation of Ink)
The components below were mixed.

| | |
|---|---|
| Dispersion prepared above | 30 parts |
| Polyoxyethylene (molecular weight: 2,000) | 10 parts |
| Diethylene glycol diethyl ether | 60 parts |

The obtained ink was kept at 25° C., and was subjected to the test. The Tc of this ink was about 50° C.

COMPARATIVE EXAMPLE 5–7

The inks of Comparative Examples 5 to 7 were prepared respectively in the same manner as in Examples 6 to 8 except that the resin was replaced by diethylene glycol.

The inks of Examples 6 to 8 and Comparative Examples 5 to 7 were tested for the three items below by use of a printer which has a band-shaped heating element to control the temperature of the recording paper at 70° C. and an ink-jet recording head of 24 nozzles of 180 pi of bubble jet type.
(1) Print density
(2) Frequency of occurrence of blurring
(3) Drying time

Evaluation Method
(Print Density)
Solid print patches of 1.3 cm×2.0 cm were formed by driving all the nozzles simultaneously on electophotographic copying paper (NP Dry, plain paper for Canon copying machine), and dried for 24 hours. The optical densities of the patches were measured.
(Frequency of blurring)
Alphabet and numeral letters of 12-point size were printed in ten lines on plain paper, and sharpness of the printed letters was evaluated with the criteria below:

| | |
|---|---|
| Excellent: | Sharp with little blurring |
| Fair: | Slight blurring observed |
| Poor: | Not clear and remarkable blurring observed |

(Drying time)
One page of alphabet and numeral letters were printed on commercial electrophotographic copying paper. The printed portion was rubbed with cleaning paper, 3 seconds, 5 seconds, 10 seconds, and 15 seconds after the printing. The time needed for non-occurrence of smearing of the letters by rubbing was measured in seconds.

The evaluation results are summarized in Table 9. Table 9 shows that the ink of the present invention which is based on phase separation of spinodal decomposition is superior in print density, print quality, and drying properties.

TABLE 9

| | Print density | Blurring | Drying time (seconds) |
|---|---|---|---|
| Example 6 | 1.28 | Excellent | 3 |
| Comparative Example 5 | 1.30 | Excellent | 40 |
| Example 7 | 1.30 | Excellent | 5 |
| Comparative Example 6 | 1.35 | Excellent | 40 |
| Example 8 | 1.33 | Excellent | 5 |
| Comparative Example 7 | 1.05 | Poor | 5 |

EXAMPLES 9–11

Alkyl methacrylate type polymers mentioned in Table 10 were used to prepare black inks having compositions shown in Table 11 in the same manner as in Examples 1–5, and the inks were evaluated in terms of optical density, fixability and blurring of printed letters. The results are shown in Table 12. It is noted that good results were obtained also in case of using these phase-changing polymers.

TABLE 10

| Symbol | Phase-changing polymer | M.W. | L.C.C.T. (Tc) | Solvent system |
|---|---|---|---|---|
| F | Poly-n-hexyl-methacrylate | 20,000 | 27° C. | Urea/water |
| G | Poly-n-octyl-methacrylate | 35,000 | 35° C. | Dioxane/water |
| H | Poly-dodecyl-methacrylate | 18,000 | 29° C. | n-Amyl alcohol/water |

M.W.: Molecular weight
L.C.C.T.: Low critical consolute temperature

TABLE 11

Composition of Black Ink in Examples 9–11

| | Example No. | | |
|---|---|---|---|
| | 9 | 10 | 11 |
| Projet Fast Black 2 Liquid H11287 | 3.0 | 3.0 | 3.0 |

TABLE 11-continued

Composition of Black Ink in Examples 9–11

| | Example No. | | |
|---|---|---|---|
| | 9 | 10 | 11 |
| Ethylene glycol | 7.0 | 7.0 | 7.0 |
| Isopropyl alcohol | 5.0 | 5.0 | 5.0 |
| Dioxane | | 30.0 | |
| n-Amyl alcohol | | | 30.0 |
| Phase-changing polymer F | 1.5 | | |
| Phase-changing polymer G | | 1.5 | |
| Phase-changing polymer H | | | 1.5 |
| Urea | 12.0 | | |
| Water | 73.0 | 53.5 | 53.5 |

TABLE 12

| Example | OD | Fixability | Blurring |
|---|---|---|---|
| 9 | 1.28 | Excellent | Good |
| 10 | 1.25 | Excellent | Good |
| 11 | 1.3 | Excellent | Good |

OD: Optical density

The ink of the present invention, which is based on the principle of phase separation of spinodal decomposition, quickly separates into phases when its temperature is elevated in printing. The phase separation prevents the phase of high coloring material concentration from penetration into the interior of paper and increases the optical density of the print. Further, penetration into small voids of the paper is also prevented, whereby blurring of the printed image is suppressed. Furthermore, the dilute phase of low coloring material concentration penetrates or evaporates quickly, whereby apparent drying is promoted and the ink fixability is improved.

What is claimed is:

1. An ink containing an aqueous medium, a coloring material, and a water-soluble polymeric compound, the ink being homogenous at a temperature lower than 40° C.,
    wherein the polymeric compound is a homopolymer having as a monomer unit an N-alkyl-substituted acrylamide that provides a lower critical consolute temperature (Tc) to the ink, the lower critical consolute temperature (Tc) causing the ink to separate into two phases, one being the aqueous medium and the other being a solid component, when the ink is heated from a first temperature (T1) to a second temperature (T2), the lower critical consolute temperature (Tc) being between (T1) and (T2), and
    the lower critical consolute temperature being in a range of from 40 to 100° C.

2. The ink according to claim 1, wherein the polymeric compound is at least one compound selected from the group consisting of poly(N-ethyl-acrylamide), poly(N-n-propyl-acrylamide), poly(N-n-propyl-methacrylamide), poly(N-isopropyl-acrylamide), poly(N-isopropyl-methacrylamide), poly(N-cyclo-propyl-acrylamide), poly(N-cyclopropyl-methacrylamide), poly(N,N-diethyl-acrylamide) and poly(N,N-diethyl-methlacrylamide).

3. The ink according to claim 1, wherein the polymeric compound is contained in the ink in an amount of from 0.5 to 5% by weight of the total ink.

4. The ink according to claim 1, wherein the coloring material is contained in the ink in an amount of from 0.5 to 10% by weight of the total ink.

5. The ink according to claim 1, wherein the coloring material is contained in the ink in an amount of from 0.5 to 5% by weight of the total ink.

6. The ink according to claim 1, further comprising an organic solvent selected from the group consisting of ethylene glycol, diethylene glycol, triethylene glycol, tripropylene glycol, glycerol, 1,2,4-butanetriol, 1,2,6-hexanetriol, 1,2,5-pentanetriol, 1,2-butanediol, 1,3-butanediol, 1,4-butanediol, dimethylsulfoxide, diacetone alcohol, glycerine monoallyl ether, propylene glycol, butylene glycol, polyethylene glycol, thiodiglycol, N-methyl-2-pyrrolidone, 2-pyrrolidone, γ-butyrolactone, 1,3-dimethyl-2-imidazolidinone, sulfolane, trimethylolpropane, trimethylolethane, neopentylglycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether, dipropylene glycol monomethyl ether, β-dihydroxyethylurea, urea, acetonylacetone, pentaerythritol, 1,4-cyclohexanediol, hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monomethyl ether, dipropylene glycol monopropyl ether, dipropylene glycol monobutyl ether, tripropylene glycol monomethyl ether, glycerine monoacetate, glycerine diacetate, glycerine triacetate, ethylene glycol monomethyl ether acetate, diethylene glycol monomethyl ether acetate, cyclohexanol, 1,2-cyclohexanediol, 1-butanol, 3-methyl-1,5-pentanediol, 3-hexane-2,5-diol, 2,3-butanediol, 1,5-pentanediol, 2,4-pentanediol, 2,5-hexanediol, ethanol, n-propanol, 2-propanol, 1-methoxy-2-propanol, furfuryl alcohol and tetrahydrofurfuryl alcohol.

7. The ink according to claim 1, wherein the polymeric compound is contained in the ink in an amount of from 0.5 to 5% by weight of the total ink, and the coloring material is contained in the ink in an amount of from 0.5 to 10% by weight of the total ink.

* * * * *

UNITED STATES PATENT AND TRADEMARK OFFICE
CERTIFICATE OF CORRECTION

PATENT NO. : 6,391,947 B1
DATED : May 21, 2002
INVENTOR(S) : Hiromichi Noguchi et al.

It is certified that error appears in the above-identified patent and that said Letters Patent is hereby corrected as shown below:

<u>Title page,</u>
Item [56], References Cited, FOREIGN PATENT DOCUMENTS,
"56147863" should read -- 56-147863 --; and
"22555875" should read -- 2-255875 --.

<u>Column 3,</u>
Line 50, "Respective" should read -- respective --.

<u>Column 6,</u>
Line 51, "enhance" should read -- enhances --.

<u>Column 8,</u>
Line 57, "off" should be deleted.

<u>Column 18,</u>
Line 4, "methlacrylamide)." should read -- methacrylamide). --.

Signed and Sealed this

Twenty-eighth Day of January, 2003

JAMES E. ROGAN
*Director of the United States Patent and Trademark Office*